United States Patent
Sheehan

(10) Patent No.: US 7,936,160 B1
(45) Date of Patent: May 3, 2011

(54) APPARATUS AND METHOD FOR VALLEY EMULATED CURRENT MODE CONTROL

(75) Inventor: Robert Agal Sheehan, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 527 days.

(21) Appl. No.: 11/740,236

(22) Filed: Apr. 25, 2007

(51) Int. Cl.
*G05F 1/565* (2006.01)

(52) U.S. Cl. .................. 323/285; 323/222; 323/288

(58) Field of Classification Search .............. 323/285, 323/222, 288, 282, 283, 286
See application file for complete search history.

(56) References Cited

U.S. PATENT DOCUMENTS

| | | | |
|---|---|---|---|
| 5,428,267 A | 6/1995 | Peil | |
| 5,903,452 A | 5/1999 | Yang et al. | |
| 6,166,528 A * | 12/2000 | Rossetti et al. | 323/283 |
| 6,246,220 B1 | 6/2001 | Isham et al. | |
| 6,377,032 B1 | 4/2002 | Andruzzi et al. | |
| 6,396,252 B1 | 5/2002 | Culpepper et al. | |
| 6,476,589 B2 | 11/2002 | Umminger et al. | |
| 6,559,684 B2 * | 5/2003 | Goodfellow et al. | 327/53 |
| 6,879,136 B1 | 4/2005 | Erisman et al. | |
| 6,930,474 B2 | 8/2005 | Wang et al. | |
| 6,952,093 B1 | 10/2005 | Broach et al. | |
| 6,969,976 B1 | 11/2005 | Broach et al. | |
| RE38,940 E | 1/2006 | Isham et al. | |
| 7,042,207 B1 | 5/2006 | Broach | |
| 7,045,993 B1 | 5/2006 | Tomiyoshi | |
| 7,119,522 B1 | 10/2006 | Tomiyoshi et al. | |
| 7,135,841 B1 | 11/2006 | Tomiyoshi et al. | |
| 7,148,669 B2 * | 12/2006 | Maksimovic et al. | 323/283 |
| 7,391,199 B2 * | 6/2008 | Akashi et al. | 323/285 |
| 7,425,819 B2 * | 9/2008 | Isobe | 323/222 |
| 2005/0219926 A1 * | 10/2005 | Tai et al. | 365/207 |

OTHER PUBLICATIONS

Linear Technology Data Sheet (1999) "LTC 1707-High Efficiency Monolithic Synchronous Step-Down Switching Regulator," Linear Technology Corporation, pp. 1-16.
Maxim Data Sheet (2001) "MAX1684/MAX1685-Low-Noise, 14V Input, 1A, PWM Step-Down Converters," Maxim Integrated Products, pp. 1-14.
Robert W. Erickson and Dragan Maksimovic, Editors, Fundamentals of Power Electronics, 2.sup.nd Edition, 2001, pp. 439-487, 654-657, 834-839.
Pressman, Abraham I. et al., "Switching Power Supply Design", 1998, pp. 143-165.
Ridley, Raymond, "A New Continuous Time Model for Current-Mode Control," IEEE Transaction on Power Electronics, vol. 6, No. 2, Apr. 1991, pp. 271-280.
Sheehan, Robert, "Emulated Current Mode Control for Buck Regulators Using Sample and Hold Technique," Power Electronics Technology Exhibition and Conference, Oct. 24-26, 2006, 48 pgs.

(Continued)

*Primary Examiner* — Harry Behm
(74) *Attorney, Agent, or Firm* — Frommer Lawrence & Haug LLP; Matthew M. Gaffney

(57) ABSTRACT

A valley current mode switching regulator is provided. When the main switch of the switching regulator is closed, the current through the main switch is sensed and sampled. The sensed main switch current is held while the main switch is off. While the main switch is off, the inductor current is emulated. Emulated valley current mode control is provided based on the sensed main switch current and the emulated flywheel current.

17 Claims, 8 Drawing Sheets

OTHER PUBLICATIONS

Babu, C. Sudhakar et al., "Predictive Valley Current Controller for Two Inductor Buck Converter," Department of Electrical Engineering, 4 pgs.

Shanker, P. et al., "A New Current Programming Technique Using Predictive Control," Department of Electrical & Computer Engineering, 1994, pp. 428-434.

"LM5116: Wide Range Synchronous Buck Controller," National Semiconductor Corporation, Feb. 2007, 26 pgs.

Bryant, Brad et al., "Modeling the Closed-Current Loop of PWM Boost DC-DC Converters Operating in CCM with Peak Current-Mode Control," IEEE Transactions on Circuits and Systems, Nov. 2005, vol. 52, No. 11, pp. 2404-2412.

Chattopadhyay, Souvik et al., "A Digital Current Mode Control Technique for DC-DC Converters," Power Electronics and Drives Group Department of Electrical Engineering, 2005, pp. 885-891.

Nishida, Yasuyuki et al., "A Predictive Instantaneous-Current PWM Controlled Rectifier with AC-Side Harmonic Current Reduction," IEEE Transactions on Industrial Electronics, vol. 44, No. 3, Jun. 1997, pp. 337-343.

Chen, Jingquan et al., "Predictive Digital Current Programmed Control," IEEE Transactions on Power Electronics, vol. 18, No. 1, Jan. 2003, pp. 411-419.

Babu, C. Sudhakar et al., "Predictive Controller for Interleaved Boost Converter," IEEE ISIE, Jun. 20-23, 2005, pp. 577-582.

* cited by examiner

Valley Current Mode

APPARATUS AND METHOD FOR VALLEY EMULATED CURRENT MODE CONTROL

FIELD OF THE INVENTION

The invention is related to voltage regulation, and in particular, to an apparatus and method for valley emulated current mode control for a switching regulator.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Figure 1:
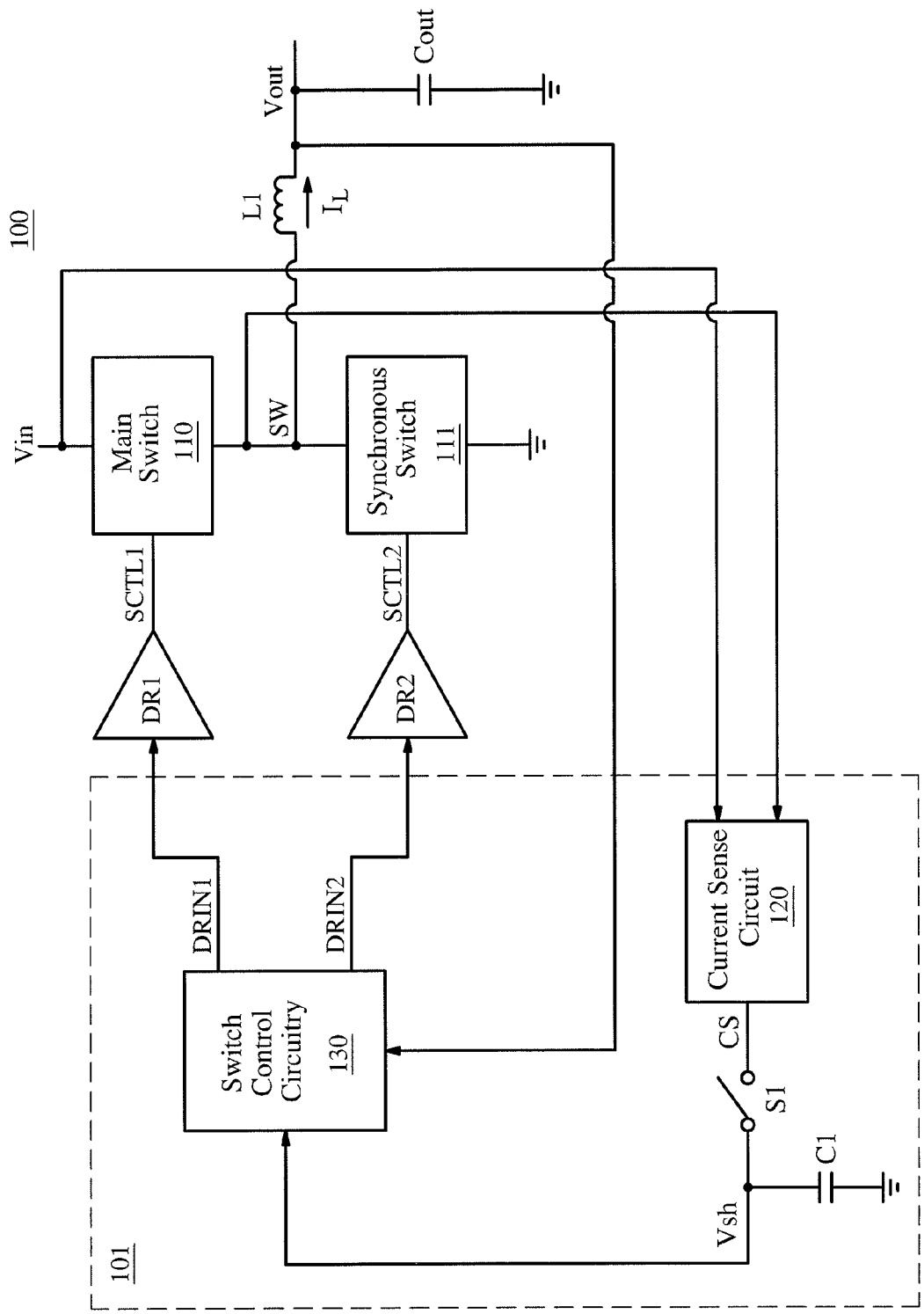
FIG. 1 illustrates a block diagram of an embodiment of a regulator circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Briefly stated, the invention is related to a valley current mode switching regulator. When the main switch of the switching regulator is closed, the current through the main switch is sensed and sampled. The sensed main switch current is held while the main switch is off. While the main switch is off, the inductor current is emulated. Emulated valley current mode control is provided based on the sensed main switch current and the emulated flywheel current.

FIG. 1 illustrates a block diagram of an embodiment of regulator circuit 100. Regulator circuit 100 includes main switch 110, synchronous switch 111, inductor L1, output capacitor Cout, drivers DR1 and DR2, and regulator controller 101. Regulator controller 101 includes current sense circuit 120, switch S1, capacitor C1, and switch control circuitry 130.

In operation, inductor L1 provides current $I_L$. More specifically, in a buck regulator topology embodiment, inductor circuit L1 is arranged such that a voltage substantially given by Vin–Vout is across inductor L1 when switch 110 is closed. Accordingly, in a buck regulator topology embodiment, $dI_L/dt$ is substantially given by (Vin–Vout)/L1 when switch 110 is closed. In a buck regulator topology embodiment, when switch 110 is open, a voltage substantially given by —Vout is across L1, so that $dI_L/dt$ is substantially given by —Vout/L1.

Also, capacitor Cout is an output capacitor for regulator circuit 100. Current-sense circuit 120 is configured to sense a current across main switch circuit 110 and provide current sense signal CS in response to the sensed current. Additionally, switch S1 and capacitor C1 are arranged to operate together as a sample-and-hold circuit to sample signal CS when main switch 110 is closed, and to hold signal CS when main switch 110 is open, to provide signal Vsh. Switch control circuitry 130 is arranged to provide driver input signal DRIN1 and driver input signal DRIN2 based, in part, on signal Vsh and output voltage Vout. Further, switch control circuitry 130 is configured to provide signal DRIN2 as a logical inverse of signal DRIN1. In various embodiments, switch control circuitry 130 may control different switching regulation topologies, including buck regulation, boost regulation, buck-boost regulation, inverting regulation, or the like. Driver DR1 is arranged to provide switch control signal SCTL1 from driver input signal DRIN1, and driver DR2 is arranged to provide switch control signal SCTL2 from driver input signal DRIN1. Additionally, switch 110 is configured to open and close responsive to signal SCTL1, and synchronous switch 111 is configured to open and close responsive to signal SCTL2.

Although FIG. 1 illustrates a step-down (buck) switching regulator topology, the invention is not so limited. Embodiments of the invention may be used in virtually any valley current mode switching regulator topology, including a boost topology, an inverting topology, a buck-boost topology, or the like. Embodiments of the invention may also include transformer isolated versions of the various topologies, and may include various combinations of ac or dc voltage or current as input, output, or controlled quantities.

Figure 2:
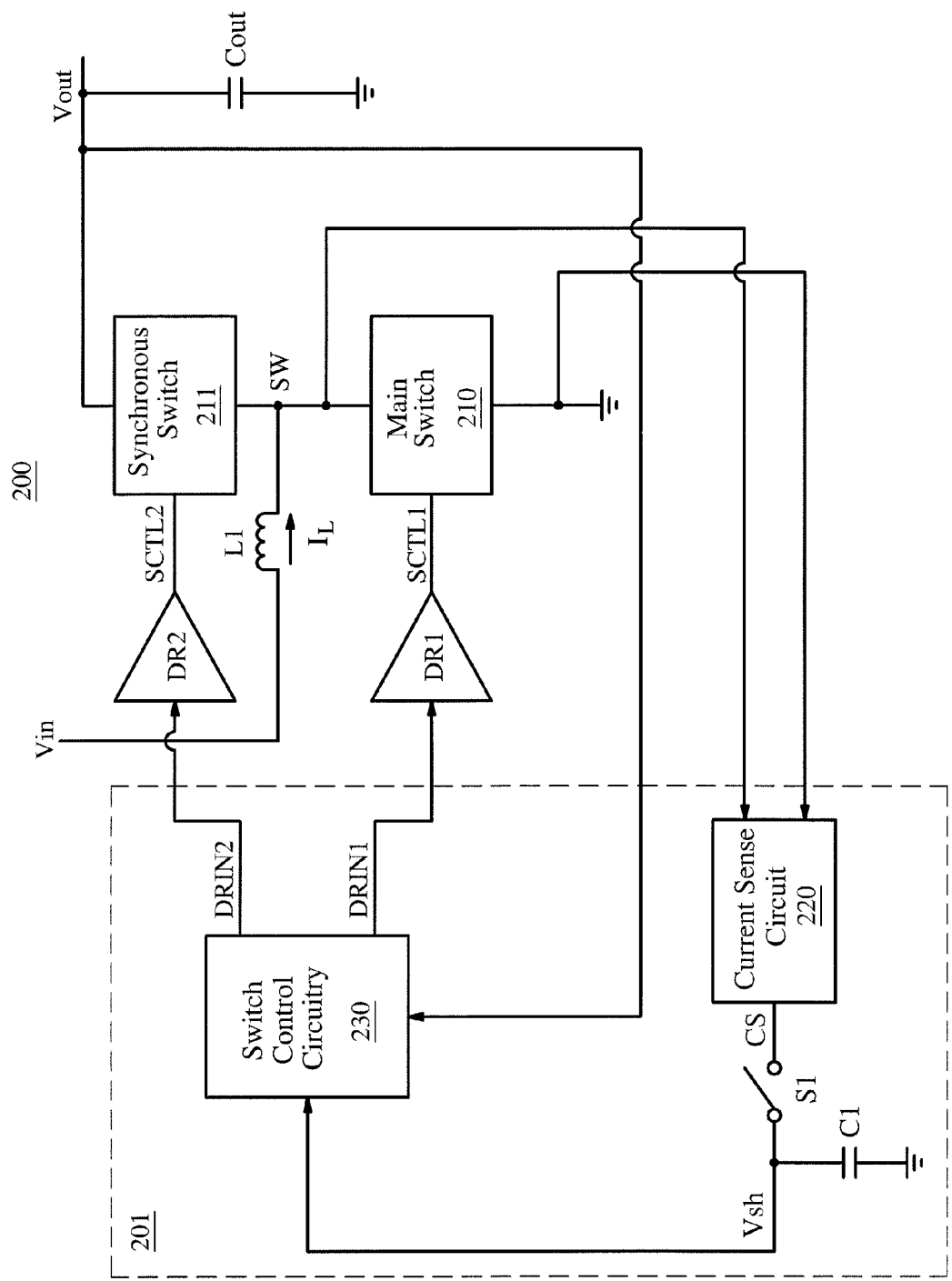
FIG. 2 shows a block diagram of an embodiment of the regulator circuit of FIG. 1 in which a boost topology is employed.

For example, FIG. 2 illustrates an embodiment of a regulator circuit 200, which is an embodiment of regulator circuit 100 in a boost topology. In regulator circuit 100 of FIG. 1, the main switch is a top-side switch and the synchronous switch is a bottom-side switch. Conversely, in regulator circuit 200 of FIG. 2 the main switch is a bottom-side switch and the synchronous switch is a top-side switch.

Figure 3:
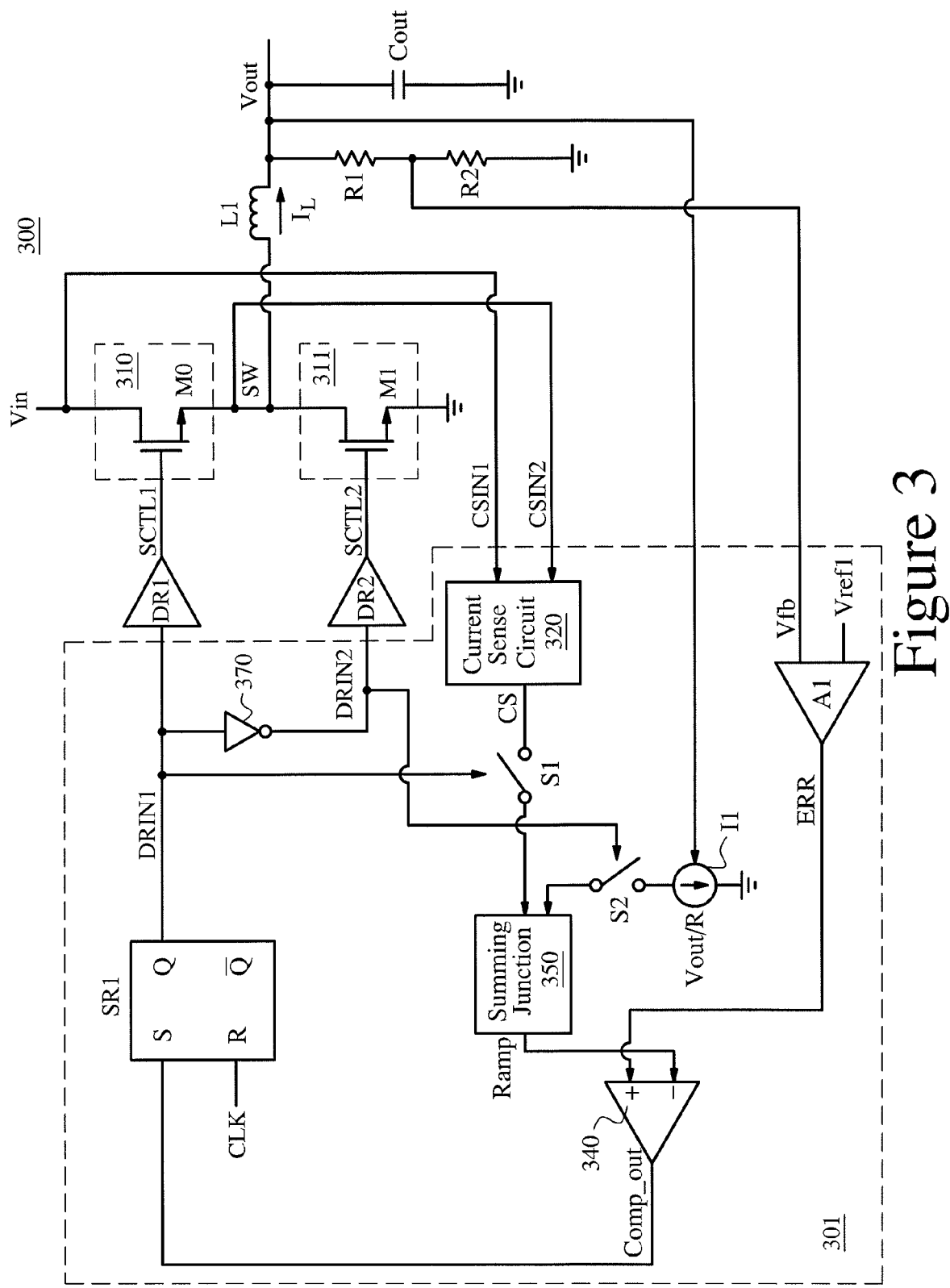
FIG. 3 illustrates a block diagram of an embodiment of the regulator circuit of FIG. 1.

FIG. 3 illustrates an embodiment of regulator circuit 300, which may be employed as an embodiment of regulator circuit 100 of FIG. 1. Regulator circuit 300 further includes resistors R1 and R2. Also, main switch 310 includes transistor M0. Synchronous switch 311 includes transistor M1. Switch control circuitry 330 includes SR latch SR1, inverter 370, PWM comparator 340, error amp A1, current source I1, and summing junction 350. Summing junction 350 includes capacitor C1 (not shown in FIG. 3) to which signals are provided at the summing junction.

In operation, regulator circuit 300 provides power regulation with valley current mode control.

While the main switch (e.g. transistor M0) is conducting and the synchronous switch (e.g. transistor M1) is not conducting, switch S1 is closed and switch S2 is open. Accordingly, while the main switch (e.g. transistor M0) is conducting, current sense voltage CS is sampled and used as signal Ramp. In a buck embodiment, signal Ramp ramps upward while the main switch (e.g. transistor M0) is conducting. When the synchronous switch (e.g. transistor M1) stops conducting and transistor M1 starts conducting, switch S1 opens and switch S2 closes. Accordingly, voltage CS is held at summing junction 350 at the moment switch S1 opens. Current provided by current source I1 is provided to summing junction 350 to emulate the slope of inductor current $I_L$ while the synchronous switch (e.g. transistor M1) is conducting.

For the specific embodiment illustrated in FIG. 3, when transistor M1 is conducting, the slope of inductor current $I_L$ is substantially given by—Vout/L1. Accordingly, the slope of voltage $V_{RAMP}$ (where $V_{RAMP}$ is the voltage associated with signal RAMP) while transistor M1 is conducting should be $V_{RAMP}/T=-Vout*Ri/L1$, where Ri represents the current sense gain (i.e. the ratio the current sense voltage CS to the current across transistor M0) and T is the period of signal CLK. Accordingly, R and C1 should be pre-selected by the designer such that the equation C1=L1/(R*Ri) is substantially satisfied.

This way, when the main switch is closed, the actual inductor current is sensed. The peak value of the inductor current is sampled and held. When the main switch is open, the downslope of the inductor current is emulated by providing current I1 to capacitor C1 of summing junction 350.

Current I1 may be provided differently in different topologies. As discussed above, for a buck regulator topology, I1=−Vout/R may be used (e.g. Vout/R with I1 as a sinking current). For a boost regulator topology, (Vin−Vout)/R as sourcing current may be used instead. In other topologies, the current provided may be different from that discussed above by providing a current that is a combination of (1) the current provided to the capacitor to generate an emulated slope, and (2) a slope compensation current (as discussed below with regard to FIG. 6 in one embodiment).

Resistors R1 and R2 may be arranged as a voltage divider that is configured to provide voltage Vfb from voltage Vout. Additionally, error amplifier A1 may be configured to provide error signal ERR from signals Vfb and Vref1 PWM comparator circuit 340 is configured to provide comparator output signal Comp_out in response to a comparison of signals ERR and Ramp. In one embodiment, SR latch SR1 is arranged to provide driver input signal DRIN1 responsive to comparator output signal Comp_out and clock signal CLK. Clock signal CLK may be provided by a clock generator (not shown). Driver DR1 may be configured to provide main switch control signal SCTL1 from signal DRIN1. Also, inverter 370 may be arranged to providing driver input signal DRIN2 by inverting signal DRV1. Driver DR2 may be arranged to provide synchronous switch control signal SCTL2 from signal DRIN2.

Although a particular arrangement regulator circuit 300 is illustrated in FIG. 3, other embodiments may include other arrangements of circuit 300. For example, current source circuit I1 may be arranged in a different manner than shown in FIG. 3. Although FIG. 3 illustrates an embodiment in which inverter 370 is employed to provide signal DRIN2 as an inverse of signal DRIN1, in other embodiments, other arrangements may be employed to provide signal DRIN2. Also, additionally circuitry such as over-voltage protection and the like may be included between the output of SR latch SR1 and driver DR1. Regulator circuit 300 may include a compensation loop for error amp A1. As previously discussed, although a buck topology is illustrated in FIG. 3, in other embodiments, a boost topology, a buck-boost topology, inverting topology, or the like may be employed.

In one embodiment, the components shown in regulator controller 301 are included together on an integrated circuit, with the components shown outside regulator controller 301 off-chip. However, in other embodiments, some of the components shown inside regulator controller 301 may be off-chip, and some of the component shown outside regulator controller 301 may be on-chip.

Each of the resistors described may consist of a single resistor only, or may include a plurality of resistors that are coupled in series and/or in parallel, and the like. Similarly, each of the capacitors described may consist of a single capacitor only, or may include a plurality of capacitors that are coupled in series and/or in parallel, and the like. Each of the inductors described may consist of a single inductor only, or may include a plurality of inductors that are coupled in series and/or in parallel, and the like. These and other embodiments are within the spirit and scope of the invention.

Regulator circuit 300 employs valley current mode control, which may be more easily understood with reference to FIG. 4B, discussed below.

Figure 4A:
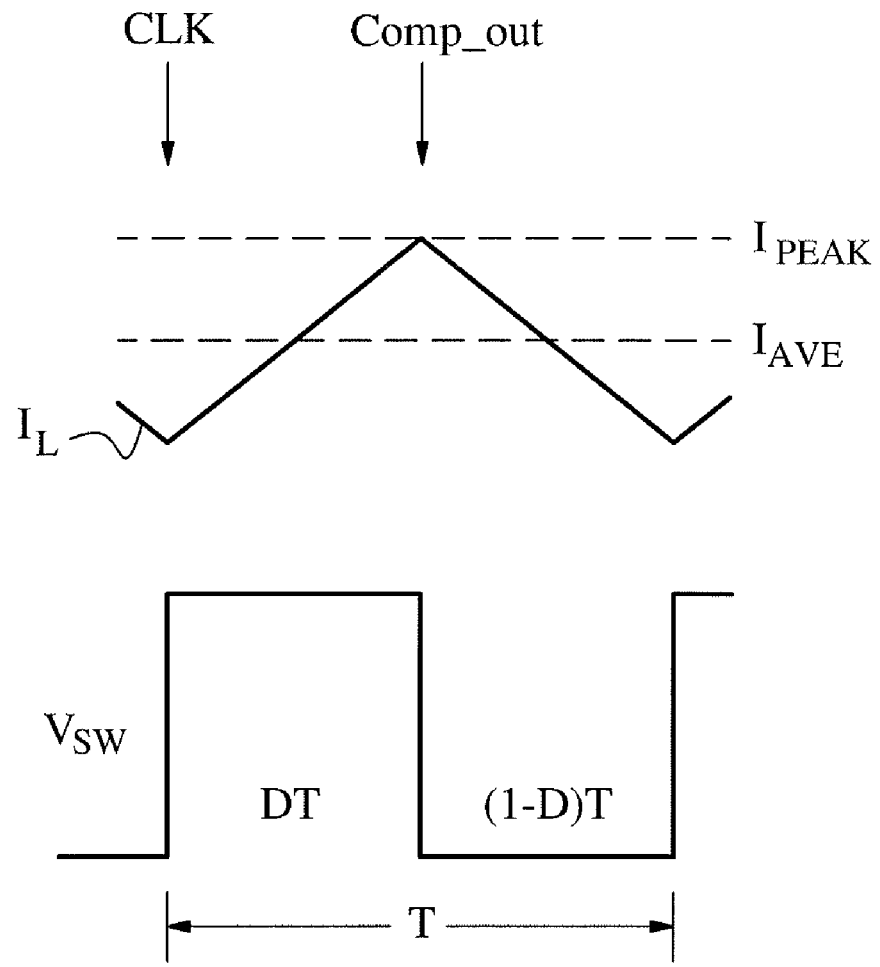
FIGS. 4A-4B show timing diagrams of peak current mode control and valley current mode control respectively.
Figure 4B:
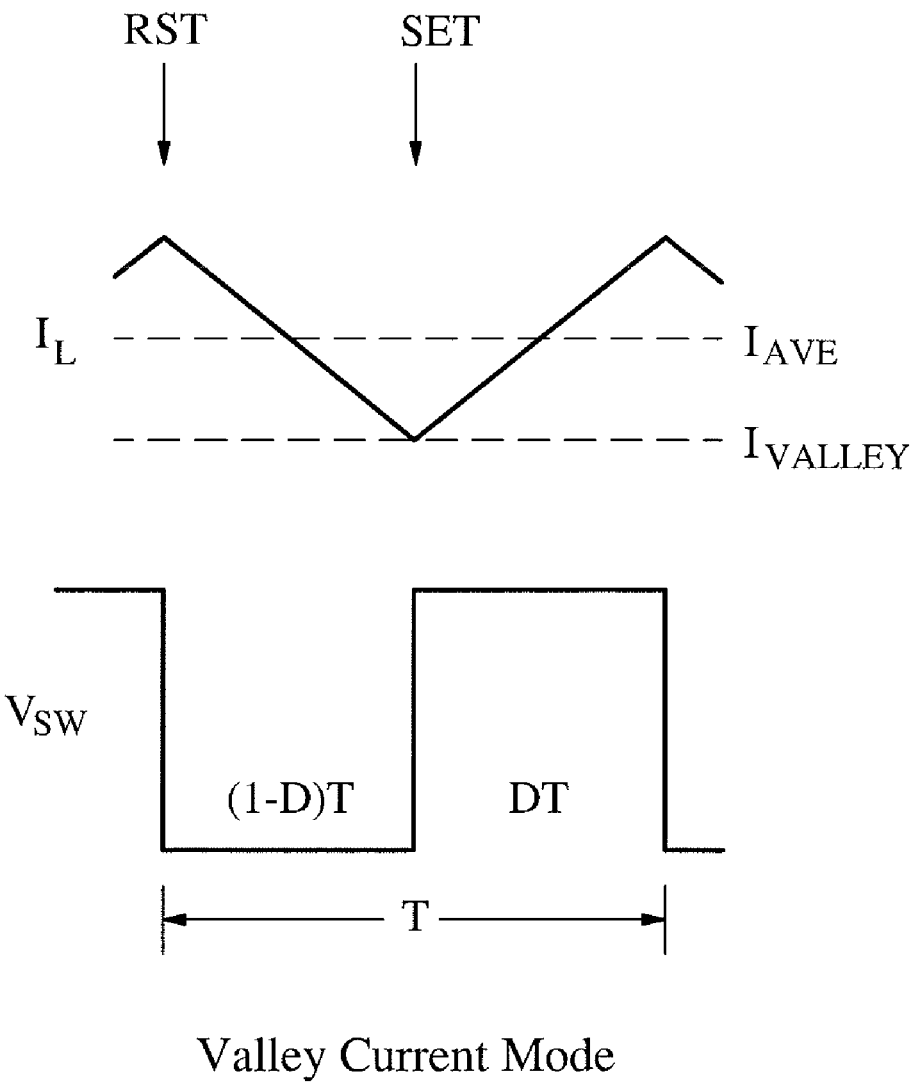

FIGS. 4A-4B show timing diagrams of peak current mode control and valley current mode control, respectively.

There are several different methods of current mode control, including peak, valley, average, and sample-and-hold. Each of these methods sample the DC current, and include an outer voltage loop and an inner current loop. The current loop gain splits the complex conjugate pole of the output LC filter into two real poles, so that the characteristics of the output LC filter are set by the output capacitor and the load resistor.

In peak current mode, as illustrated in FIG. 4A, inductor current $I_L$ begins ramping upward at the beginning of each clock cycle. Once inductor current $I_L$ reaches a peak current threshold, $I_{PEAK}$, inductor current $I_L$ then begins ramping downward. It continues ramping downward until the beginning of the next clock cycle, where it begins ramping upward again.

In valley current mode, as illustrated in FIG. 4B, inductor current $I_L$ begins ramping downward at the beginning of each clock cycle. Once inductor current $I_L$ reaches a valley current threshold, $I_{VALLEY}$, inductor current $I_L$ then begins ramping upward. It continues ramping upward until the beginning of the next clock cycle, where it begins ramping downward again.

Figure 5:
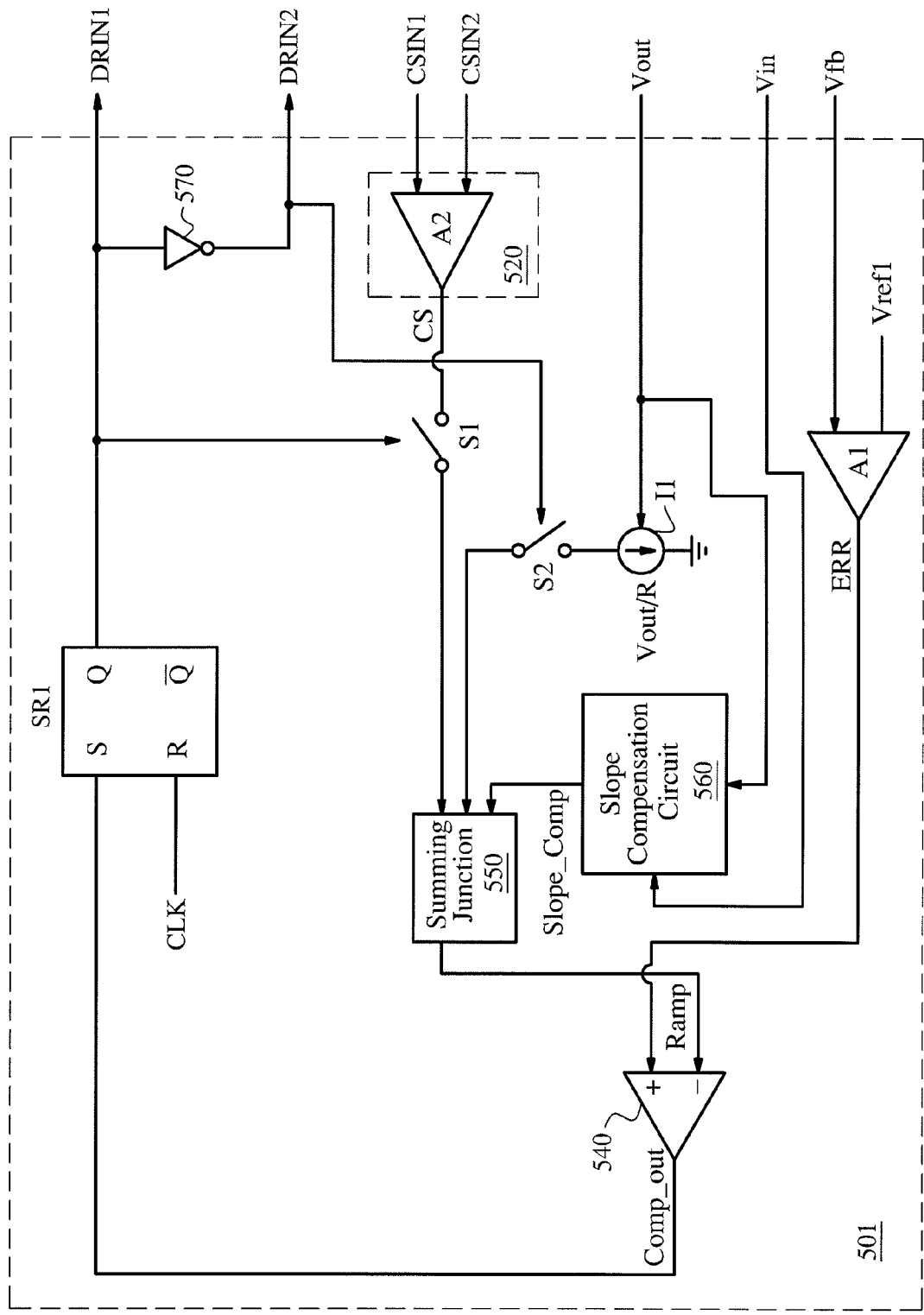
FIG. 5 illustrates a block diagram of an embodiment of the regulator controller of FIG. 3.

FIG. 5 illustrates an embodiment of the regulator controller 501 of FIG. 5, which is an embodiment of valley current mode regulator controller 301 of FIG. 301. Regulator controller 501 further includes slope compensation circuit 560.

In regulator controller 501, summing junction 550 includes another input for slope compensation signal Slope_comp so that signal Slope_comp is added to the signals that are summed at summing junction 550.

Slope compensation is used in order to help stabilize gain and prevent sub-harmonic oscillation, by adding an external ramp $V_{SLOPE}$ to the current sense signal. Slope compensation essentially compensates for the fact that valley current is being used rather than average current; slope compensation is not needed for average current mode.

In one embodiment, signal Slope_comp is a fixed ramp (e.g., the slope of the ramp is constant).

In another embodiment, the ramp is proportional to the opposite slope of the inductor. This may cause any tendency toward sub-harmonic oscillation to damp in one switching cycle. For example, for one buck embodiment, signal Slope_comp may be a voltage substantially given by (Vin−Vout)*Ri/L1. In this example, the down-slope of the emulated inductor current is provided as signal Ramp is Vout*Ri/L1. In this embodiment, when switch S2 is closed, the total slope is [(Vin−Vout)*Ri/L1]+Vout*Ri/L1=Vin*Ri/L.

Figure 6:
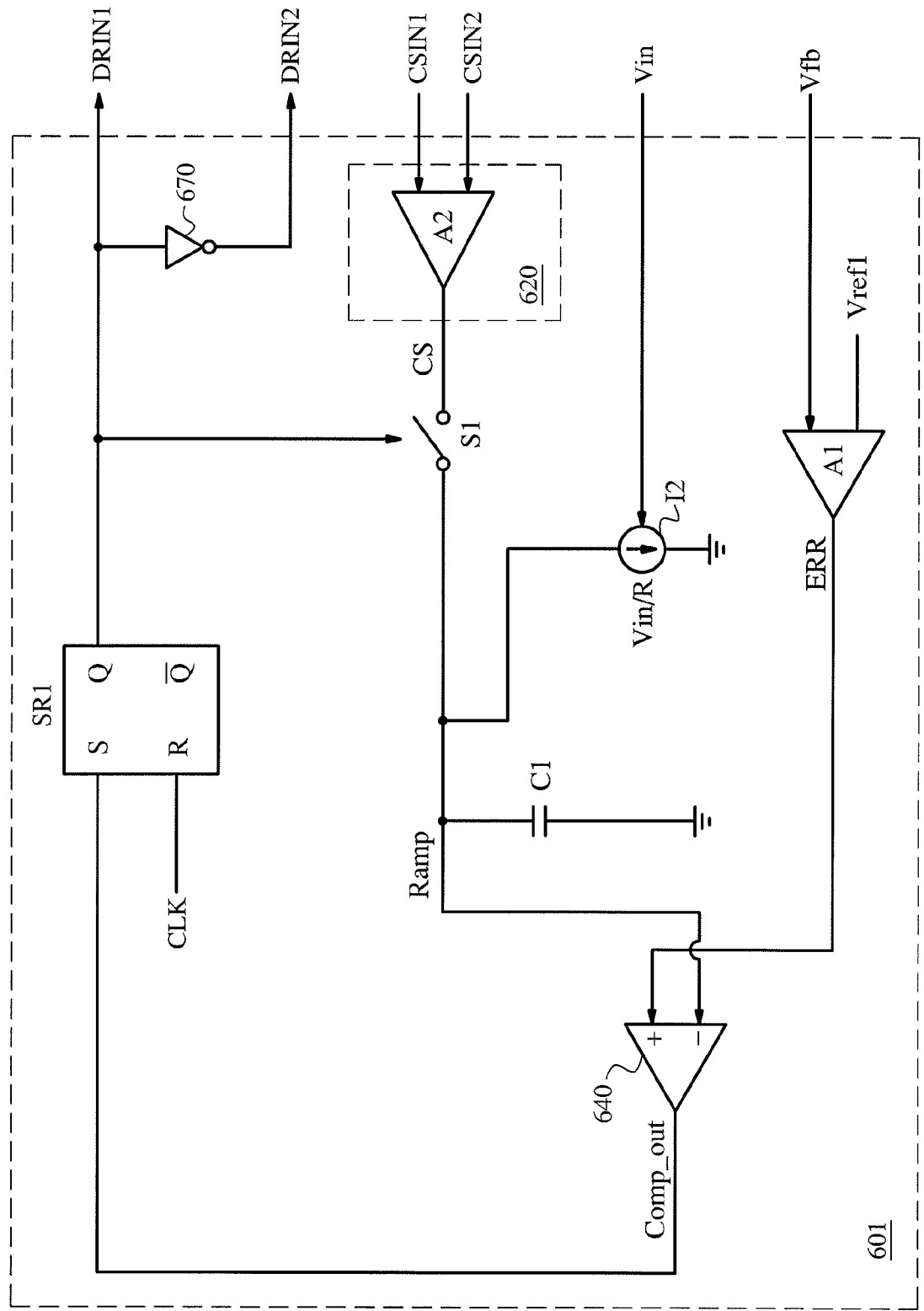
FIG. 6 shows a block diagram of an embodiment of the regulator controller of FIG. 5.

Accordingly, in another example embodiment, as illustrated in FIG. 6, this combined ramp may be provided by current source I1 rather providing a separate slope compensation and a separate emulated down-slope signal and combining them. For example, for a buck embodiment, since the combined down-slope is [(Vin−Vout)*Ri/L1]+Vout*Ri/L1=Vin*Ri/L, a ramp having a down-slope of Vin*Ri/L may be provided rather than providing separate slope compensation and down-slope emulation signal, as illustrated in FIG. 6.

FIG. 6 shows an embodiment of the regulator controller 601, which is similar to regulator controller 501 of FIG. 5 in some ways, albeit different in other ways. In regulator controller 601, the slope compensation circuit 560 and current source I1 are replaced by capacitor C1 and current source 12, which operate to provide a signal that combines slope compensation and emulated down slope. The node at the top of capacitor C1 is a summing junction since current voltage CS and current from current source 12 are both provided to capacitor C1.

In a buck embodiment, current source circuit 12 provides current given by Vin/R, as shown in FIG. 6. Accordingly, in this embodiment, the down-slope of signal Ramp is Vin*Ri/L, which is a combination of the emulated down-slope and the ramp compensation.

In a boost embodiment, a current given by Vout/R may be provided. In a buck-boost embodiment, a current given by (Vin+Vout)/R may be provided.

Although one particular embodiment is illustrated in FIG. 6, other embodiments are within the scope of the spirit of the invention. For example, other embodiments may use a separate sample and hold capacitor, with an additional emulation ramp capacitor, slope compensation capacitor and associated switches, or the functions may be combined by C1.

Signals CS, RAMP and ERR may be configured or reconfigured in such a manner as to use ground referenced, positive or negative supply voltages, with normal or inverted slopes and polarities to accommodate such.

Figure 7:
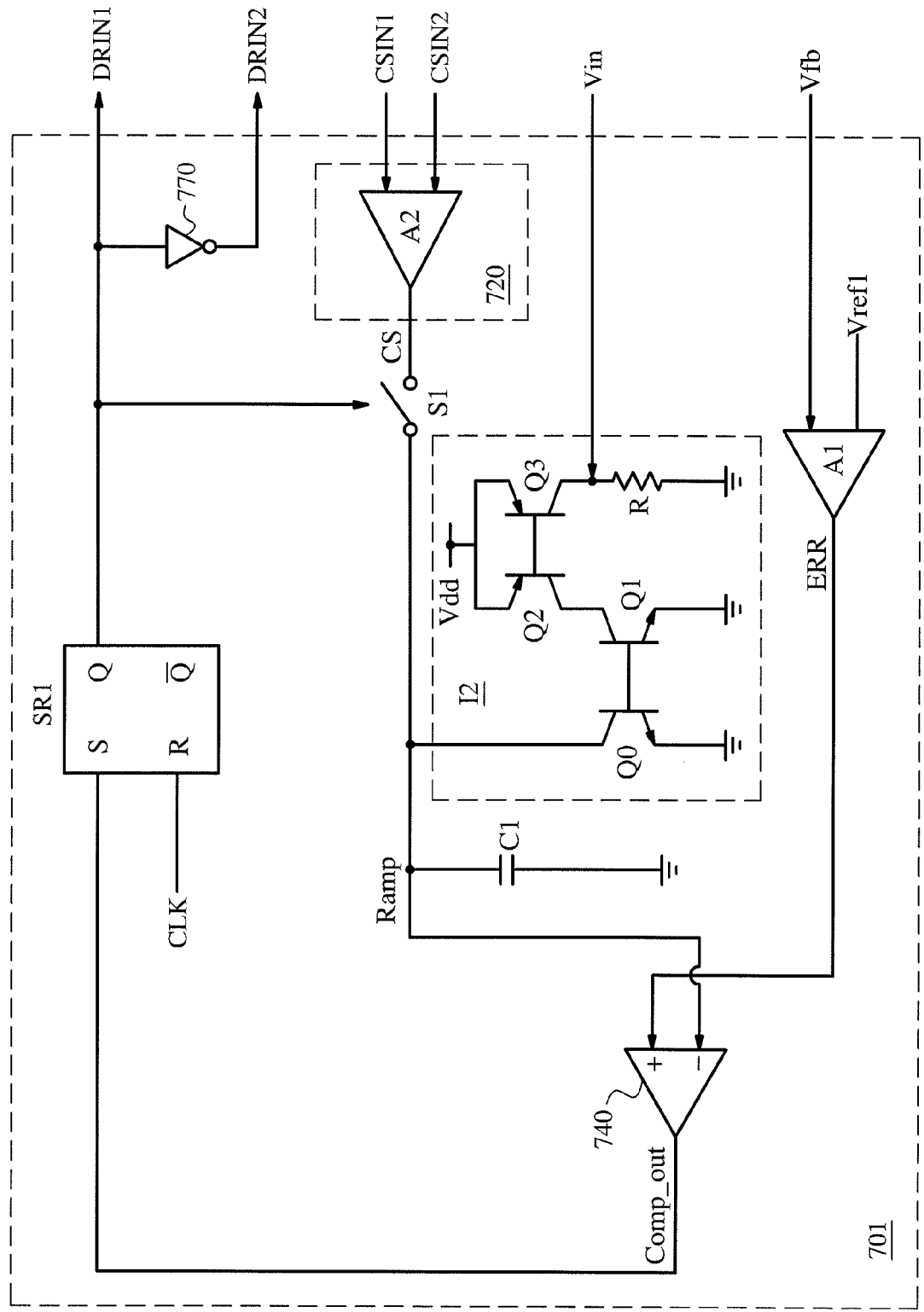
FIG. 7 illustrates an embodiment of the regulator controller of FIG. 6, arranged in accordance with aspects of the invention.

FIG. 7 illustrates an embodiment of regulator controller 701, which may be employed as an embodiment of regulator controller 601 of FIG. 6. Current source 12 includes resistor R and transistors Q0-Q3.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for current mode switching regulation, comprising:
   a valley current mode switching regulator controller that is arranged to provide a first switch control signal to a main switch based, in part, on a capacitor voltage and an output voltage, wherein the valley current mode switching regulator controller includes:
   a current sense circuit that is arranged to sense a current across the main switch, and to provide a current sense voltage at a current sense node based on the sensed current;
   a sampling switch that is coupled between the current sense node and a capacitor node, wherein the sampling switch is arranged to close if the main switch is closed, and to open if the main switch is open; and
   a capacitor that is coupled to the capacitor node, wherein the capacitor is arranged to provide the capacitor voltage at the capacitor node, wherein the valley current mode switching regulator controller is further arranged to provide a synchronous switch control signal to a synchronous switch based, in part, on the first switch control signal, wherein the valley current mode switching regulator controller is a buck valley current mode switching regulator controller, the main switch is a high-side switch, and wherein the synchronous switch is a low-side switch.

2. A circuit for current mode switching regulation, comprising:
   a valley current mode switching regulator controller that is arranged to provide a first switch control signal to a main switch based, in part, on a capacitor voltage and an output voltage, wherein the valley current mode switching regulator controller includes:
   a current sense circuit that is arranged to sense a current across the main switch, and to provide a current sense voltage at a current sense node based on the sensed current;
   a sampling switch that is coupled between the current sense node and a capacitor node, wherein the sampling switch is arranged to close if the main switch is closed, and to open if the main switch is open; and
   a capacitor that is coupled to the capacitor node, wherein the capacitor is arranged to provide the capacitor voltage at the capacitor node, wherein the valley current mode switching regulator controller is further arranged to provide a synchronous switch control signal to a synchronous switch based, in part, on the first switch control signal, wherein the valley current mode switching regulator controller is a boost valley current mode switching regulator controller, the main switch is a low-side switch, and wherein the synchronous switch is a high-side switch.

3. A circuit for current mode switching regulation, comprising:
   a valley current mode switching regulator controller that is arranged to provide a first switch control signal to a main switch based, in part, on a capacitor voltage and an output voltage, wherein the valley current mode switching regulator controller includes:
   a current sense circuit that is arranged to sense a current across the main switch, and to provide a current sense voltage at a current sense node based on the sensed current;
   a sampling switch that is coupled between the current sense node and a capacitor node, wherein the sampling switch is arranged to close if the main switch is closed, and to open if the main switch is open;
   a capacitor that is coupled to the capacitor node, wherein the capacitor is arranged to provide the capacitor voltage at the capacitor node, wherein the valley current mode switching regulator controller is further arranged to provide a synchronous switch control signal to a synchronous switch based, in part, on the first switch control signal;
   a summing junction that is coupled to the capacitor node; and
   a current source circuit that is arranged to provide a first current to the summing junction such that the first current is based, at least in part, on an emulated inductor current downslope such that an inductor current downslope is emulated while the sampling switch is open.

4. The circuit of claim 3, wherein the valley current mode switching regulator controller further includes:
an error amplifier having at least a first input that is arranged to receive a reference signal; a second input that is arranged to receive a feedback signal that is based, at least in part, on the output voltage; and an output;
a comparator having at least a first input that is coupled to the output of the error amplifier, a second input that is coupled to the summing junction, and an output;
a clock generator that is arranged to provide a clock signal having a plurality of clock cycles;
a latch circuit having at least a first input, a second input, and an output, wherein the first input of the latch circuit is coupled to the output of the comparator; the second input of the latch circuit is arranged to receive the clock signal; and wherein the latch circuit is arranged to provide the first switch control signal at the output of the latch circuit such that main switch is opened at the beginning of each clock cycle of the clock signal such that the inductor current ramps downward, and such that the main switch is closed when the inductor current reaches a valley current threshold.

5. A circuit for current mode switching regulation, comprising:
a valley current mode switching regulator controller that is arranged to provide a first switch control signal to a main switch based, in part, on a capacitor voltage and an output voltage, wherein the valley current mode switching regulator controller includes:
a current sense circuit that is arranged to sense a current across the main switch, and to provide a current sense voltage at a current sense node based on the sensed current;
a sampling switch that is coupled between the current sense node and a capacitor node, wherein the sampling switch is arranged to close if the main switch is closed, and to open if the main switch is open;
a capacitor that is coupled to the capacitor node, wherein the capacitor is arranged to provide the capacitor voltage at the capacitor node;
a summing junction that is coupled to the capacitor node; and
a current source circuit that is arranged to provide a first current to the summing junction such that the first current is based, at least in part, on an emulated inductor current downslope such that an inductor current downslope is emulated while the sampling switch is open, wherein
the current source circuit is arranged to provide the first current such that the first current is further based, in part, on slope compensation.

6. The circuit of claim 5, wherein the valley current mode switching regulator controller is arranged to control conversion of an input voltage into the output voltage, the valley current mode switching regulator controller is a buck valley current mode switching regulator controller, and wherein the current source circuit is arranged to provide the first current such that the first current is substantially proportional to the input voltage and substantially independent of the output voltage.

7. The circuit of claim 5, wherein the valley current mode switching regulator controller is arranged to control conversion of an input voltage into the output voltage, the valley current mode switching regulator controller is a boost valley current mode switching regulator controller, and wherein the current source circuit is arranged to provide the first current such that the first current is substantially proportional to the output voltage and substantially independent of the input voltage.

8. The circuit of claim 5, wherein the valley current mode switching regulator controller is arranged to control conversion of an input voltage into the output voltage, the valley current mode switching regulator controller is a buck-boost valley current mode switching regulator controller, and wherein the current source circuit is arranged to provide the first current such that the first current is substantially proportional to a sum of the input voltage and the output voltage.

9. A circuit for current mode switching regulation, comprising:
a valley current mode switching regulator controller that is arranged to provide a first switch control signal to a main switch based, in part, on a capacitor voltage and an output voltage, wherein the valley current mode switching regulator controller includes:
a current sense circuit that is arranged to provide a current sense voltage at a current sense node, wherein the current sense voltage is based on an inductor current while the inductor current slopes upwards;
a sampling switch that is coupled between the current sense node and a capacitor node, wherein the sampling switch is arranged to be closed if the inductor current is ramping upwards, and to be open if the inductor current is ramping downwards; and
a capacitor that is coupled to the capacitor node, wherein the capacitor is arranged to provide the capacitor voltage at the capacitor node.

10. The circuit of claim 9, wherein the valley current mode switching regulator controller is arranged to control a regulation of the output voltage to perform at least one of buck regulation, boost regulation, buck/boost regulation, inverting regulation, forward regulation, or flyback regulation.

11. The circuit of claim 9, wherein the valley current mode switching regulator controller further includes:
a summing junction that is coupled to the capacitor node; and
a current source circuit that is arranged to provide a first current to the summing junction such that the first current is based, at least in part, on an emulated inductor current downslope such that an inductor current downslope is emulated while the sampling switch is open.

12. The circuit of claim 1, wherein the valley current mode switching regulator controller further includes:
an error amplifier having at least a first input that is arranged to receive a reference signal; a second input that is arranged to receive a feedback signal that is based, at least in part, on the output voltage; and an output;
a comparator having at least a first input that is coupled to the output of the error amplifier, a second input that is coupled to the summing junction, and an output;
a clock generator that is arranged to provide a clock signal having a plurality of clock cycles;
a latch circuit having at least a first input, a second input, and an output, wherein the first input of the latch circuit is coupled to the output of the comparator; the second input of the latch circuit is arranged to receive the clock signal; and wherein the latch circuit is arranged to provide, the first switch control signal at the output of the latch circuit such that main switch is opened at the beginning of each clock cycle of the clock signal such that the inductor current ramps downward, and such that the main switch is closed when the inductor current reaches a valley current threshold.

13. The circuit of claim 11, wherein
the current source circuit is arranged to provide the first current such that the first current is further based, in part, on slope compensation.

14. A method for current mode switching regulation, comprising:
converting an input voltage into an output voltage such that the output voltage is regulated, wherein converting the input voltage into the output voltage includes:
providing a clock signal having a plurality of clock cycles;
employing a ramp signal and an error signal to control an inductor current associated with an inductor such that:
the inductor current ramps downward at the beginning of each clock cycle of the clock signal; and
when the inductor current reaches a valley current threshold that is based on valley current mode control, the inductor current ramps upward;
while the inductor current is ramping upward, providing a current sense voltage that is based, at least in part, on the inductor current while the inductor current is ramping upward;
while the inductor current is ramping downward, emulating the inductor downslope such that the emulated inductor downslope emulates the actual inductor downslope but is independent of the actual inductor;
de-coupling the actual inductor current from the current sense voltage while the inductor current is ramping downward such that the current sense voltage is isolated from the actual inductor current while the inductor current is ramping downward; and
providing the ramp signal based on a combination of the current sense voltage and the emulated inductor downslope.

15. The method of claim 14, wherein the conversion of the input voltage into the output voltage includes at least one of at least one of buck regulation, boost regulation, buck/boost regulation, inverting regulation, forward regulation, or flyback regulation.

16. A method for current mode switching regulation, comprising:
converting an input voltage into an output voltage such that the output voltage is regulated, wherein converting the input voltage into the output voltage includes:
providing a clock signal having a plurality of clock cycles;
employing a ramp signal and an error signal to control an inductor current associated with an inductor such that:
the inductor current ramps downward at the beginning of each clock cycle of the clock signal; and
when the inductor current reaches a valley current threshold that is based on valley current mode control, the inductor current ramps upward;
while the inductor current is ramping upward, providing a current sense voltage that is based, at least in part, on the inductor current while the inductor current is ramping upward;
while the inductor current is ramping downward, emulating the inductor downslope such that the emulated inductor downslope emulates the actual inductor downslope but is independent of the actual inductor; and
providing the ramp signal based on a combination of the current sense voltage and the emulated inductor downslope, wherein providing the ramp signal based on a combination of the current sense voltage, the emulated inductor downslope, and slope compensation.

17. The method of claim 16, wherein providing the ramp signal based on a combination of the current sense voltage, the emulated inductor downslope, and the slope compensation is accomplished by combining the current sense voltage with another signal, wherein said another signal has a current that is the sum of the emulated inductor downslope and the slope compensation.

* * * * *

UNITED STATES PATENT AND TRADEMARK OFFICE
CERTIFICATE OF CORRECTION

| | |
|---|---|
| PATENT NO. | : 7,936,160 B1 |
| APPLICATION NO. | : 11/740236 |
| DATED | : May 3, 2011 |
| INVENTOR(S) | : Robert Agal Sheehan |

It is certified that error appears in the above-identified patent and that said Letters Patent is hereby corrected as shown below:

In column 3, line 46, delete "Vref1" and insert -- Vref1. --, therefor.

In column 5, line 21, delete "12," and insert -- I2, --, therefor.

In column 5, line 25, delete "12," and insert -- I2, --, therefor.

In column 5, line 27, delete "12," and insert -- I2, --, therefor.

In column 5, line 47, delete "12," and insert -- I2, --, therefor.

In column 8, line 49, in Claim 12, delete "claim 1," and insert -- claim 11, --, therefor.

In column 8, lines 64-65, in Claim 12, delete "provide," and insert -- provide --, therefor.

Signed and Sealed this
Nineteenth Day of July, 2011

David J. Kappos
*Director of the United States Patent and Trademark Office*